United States Patent
Bossecker et al.

(10) Patent No.: US 12,473,015 B2
(45) Date of Patent: Nov. 18, 2025

(54) POSITION SENSOR

(71) Applicant: Schaeffler Technologies AG & Co. KG, Herzogenaurach (DE)

(72) Inventors: Maximilian Bossecker, Hügelsheim (DE); Trenton Dean, Casco, MI (US); Patrick Lindemann, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/645,927

(22) Filed: Apr. 25, 2024

(65) Prior Publication Data

US 2024/0359726 A1 Oct. 31, 2024

Related U.S. Application Data

(60) Provisional application No. 63/461,726, filed on Apr. 25, 2023.

(51) Int. Cl.
*F16H 25/20* (2006.01)
*B62D 5/04* (2006.01)

(52) U.S. Cl.
CPC ......... *B62D 5/0445* (2013.01); *B62D 5/0481* (2013.01); *F16H 25/2015* (2013.01); *F16H 2025/209* (2013.01)

(58) Field of Classification Search
CPC ........ F16H 25/2015; F16H 55/14; F16H 1/16; F16H 57/0006; F16H 57/0018; B62D 15/0225
See application file for complete search history.

(56) References Cited

U.S. PATENT DOCUMENTS

| | | | |
|---|---|---|---|
| 4,660,844 A | 4/1987 | Yamamoto et al. | |
| 11,180,193 B2 * | 11/2021 | Toyama | G01B 5/24 |
| 11,339,864 B2 * | 5/2022 | Hedge | F16F 15/1428 |
| 11,780,329 B2 * | 10/2023 | Wenthen | F16D 13/648 475/204 |
| 11,897,549 B2 * | 2/2024 | Jeon | F16H 7/02 |
| 2012/0137800 A1 | 6/2012 | Park et al. | |

FOREIGN PATENT DOCUMENTS

| | | |
|---|---|---|
| DE | 102016222863 A1 | 6/2017 |
| DE | 102017126845 A1 | 6/2018 |
| DE | 102020123965 B4 | 12/2022 |
| EP | 3350545 B1 | 7/2021 |
| EP | 3715221 B1 | 8/2021 |
| SU | 163937 A1 * | 3/1991 |
| SU | 1636937 A1 | 3/1991 |
| WO | 2020256336 A1 | 12/2020 |

* cited by examiner

*Primary Examiner* — Gregory Robert Weber
(74) *Attorney, Agent, or Firm* — Volpe Koenig

(57) ABSTRACT

A ball screw drive for a vehicle steering system is provided, with the ball screw drive including a nut configured to receive torque from a power transmission drive. The nut has internal threads, and external threads are provided on the nut or connected thereto for rotation with the nut. A threaded spindle having a spindle thread is provided, with the threaded spindle being drivable by the internal threads of the nut such that rotary motion of the nut is translated into linear motion of the threaded spindle. A rotational angle sensor is provided having a sensor gear that is rotatably driven by the external threads of the nut, and the rotational angle sensor is configured to generate an electric signal based on a rotational position of the sensor gear.

20 Claims, 10 Drawing Sheets

POSITION SENSOR

CROSS-REFERENCE TO RELATED APPLICATIONS

This application claims the benefit of U.S. Provisional Patent Application No. 63/461,726, filed Apr. 25, 2023, which is incorporated herein by reference as if fully set forth.

TECHNICAL FIELD

This invention is generally related to a position sensor for a steering system, and more particularly to a position sensor for a linear position of a steering rack.

BACKGROUND

Position sensors are utilized in many vehicular systems to facilitate control and monitoring of a position of a variably displaceable component. Position sensors can provide electronic signals or feedback to electronic control units to enable such position control.

Known rotational multi-turn-sensors are described in EP 3715221B1 and DE 102017126845A1. These incorporate two spur gears with different radios driven by the to-be-measured shaft. Both sensor gears carry a target (e.g. a magnet) and both measured rotation angles in combination indicate an absolute-turning angle, non-repetitive over several turns.

Other sensor arrangements are known from WO 20256336A1, DE 102020123965A1 and DE 102016222863A1.

Packaging and robustness are key characteristics of position sensors.

SUMMARY

In one aspect, a ball screw drive for a vehicle steering system is provided, the ball screw drive including a nut configured to receive torque from a power transmission drive, the nut having internal threads, and external threads being provided on the nut or connected thereto for rotation with the nut. A threaded spindle having a spindle thread is provided, with the threaded spindle being drivable by the internal threads of the nut such that rotary motion of the nut is translated into linear motion of the threaded spindle. A rotational angle sensor is provided having a sensor gear rotatably driven by the external threads of the nut. The rotational angle sensor is configured to generate an electric signal based on a rotational position of the gear. With this arrangement, high positional accuracy with low sliding power, low energy use and low wear is provided that can be arranged in a space-optimized manner.

In one embodiment, the nut is configured as a worm gear via the external threads and the gear is configured as a worm wheel.

In one embodiment, a rotational axis of the gear is perpendicular to a rotational axis of the nut. Alternatively, a rotational axis of the gear can be arranged obliquely relative to a rotational axis of the nut.

In one embodiment, the gear is mounted on a shaft, and a magnet is connected to the shaft, for example at an opposite end from the gear.

In one embodiment, the nut may further include a bearing. Here, the bearing can be arranged at a first end of the nut, and the external threads are arranged at a second end of the nut. Alternatively, the bearing can be arranged at a medial position on the nut, and the external threads are arranged at an end of the nut.

In one embodiment, a pitch of the external threads is less than one-third of a pitch of the spindle thread. The specific ratio can vary, and could be, for example one-half to one-eighth depending on the accuracy of the displacement measurement desired and the particular application.

In one embodiment, the teeth of the gear define a helix angle less than 30 degrees. However, the specific helix angle could be, for example, from 10 to 45 degrees.

In one application, the number of the teeth on the gear is between 20 and 35. However, the number of teeth can vary depending on the accuracy of the displacement measurement desired, the particular application, space constraints as well as other factors.

In one embodiment, the teeth of the gear are biased to engage with the external threads. The teeth may be biased via circumferential elasticity of the gear, for example, based on an elastic structure in the gear body itself, an elastic connection to the gear shaft, and elastic shaft, and/or an elastic mounting of the shaft in the housing, such as an elastic bearing or bushing or an elastic housing interface for a shaft support bearing or bushing.

In one embodiment, the gear is arranged in a follower configuration relative to the nut. The follower configuration may include a link attached to a shaft of the gear and arranged for movement with the nut such that radial displacement of the nut is translated to the gear via the link. For example, the link could be a bracket from the outer ring of the BNA support bearing.

In one embodiment, rolling elements, such as bearing balls or rollers, are located between the internal thread and the spindle thread.

In another aspect, a ball screw drive for a vehicle steering system is provided. The ball screw drive includes a nut having internal threads and a drive element having external threads and a power transmission interface, with the drive element secured to the nut and configured to receive torque via the power transmission interface. A threaded spindle is configured to cooperate with: i) internal threads of the spindle, and ii) rolling elements arranged radially between the internal threads of the nut and spindle threads of the threaded spindle, such that rotary motion of the nut is translated to linear motion of the threaded spindle. A rotational angle sensor is provided including a gear that is rotatably driven by the external threads, and the rotational angle sensor is configured to generate an electric signal based on rotation of the gear.

In one embodiment, the rotational angle sensor is a Hall-effect sensor.

In one embodiment, a housing is provided that is configured to house the spindle and the nut; and sensor electronics are attached to the housing, with the sensor electronics being configured to cooperate with a magnet that rotates with the gear to generate the electric signal.

In another aspect, a ball screw drive for a vehicle steering system is provided having a nut configured to receive torque from a power transmission drive, with the nut having internal threads. A threaded spindle having a spindle thread is provided, with the threaded spindle being drivable by the internal threads of the nut such that rotary motion of the nut is translated into linear motion of the threaded spindle. A rotational angle sensor having a sensor gear that is rotatably driven by the nut is provided, and the sensor gear is elastically biased against a mating thread of the nut or that is driven by the nut, and the rotational angle sensor is configured to generate an electric signal based on a rotational position of the gear. This improves accuracy by reducing or eliminating gear lash. The sensor gear itself can provide the elasticity for the elastic biasing and/or it can be wounded on an elastic shaft or by elastic shaft supports.

Such a rotational angle sensor could also be provided for other applications where it is desirable to reduce or eliminate gear lash.

One or more aspects according to the embodiments as noted above may be combined in various manners or used separately.

BRIEF DESCRIPTION OF THE DRAWINGS

The foregoing Summary will be best understood when read in conjunction with the appended drawings. In the drawings.

DETAILED DESCRIPTION

Certain terminology is used in the following description for convenience only and is not limiting. "Axial" refers to a direction along an axis. A reference to a list of items that are cited as "at least one of a, b, or c" (where a, b, and c represent the items being listed) means any single one of the items a, b, or c, or combinations thereof. The terms "generally", "about" and "approximately" are to be construed as within 10% of a stated value, angle or ratio. The terminology includes the words specifically noted above, derivatives thereof, and words of similar import.

Figure 1:
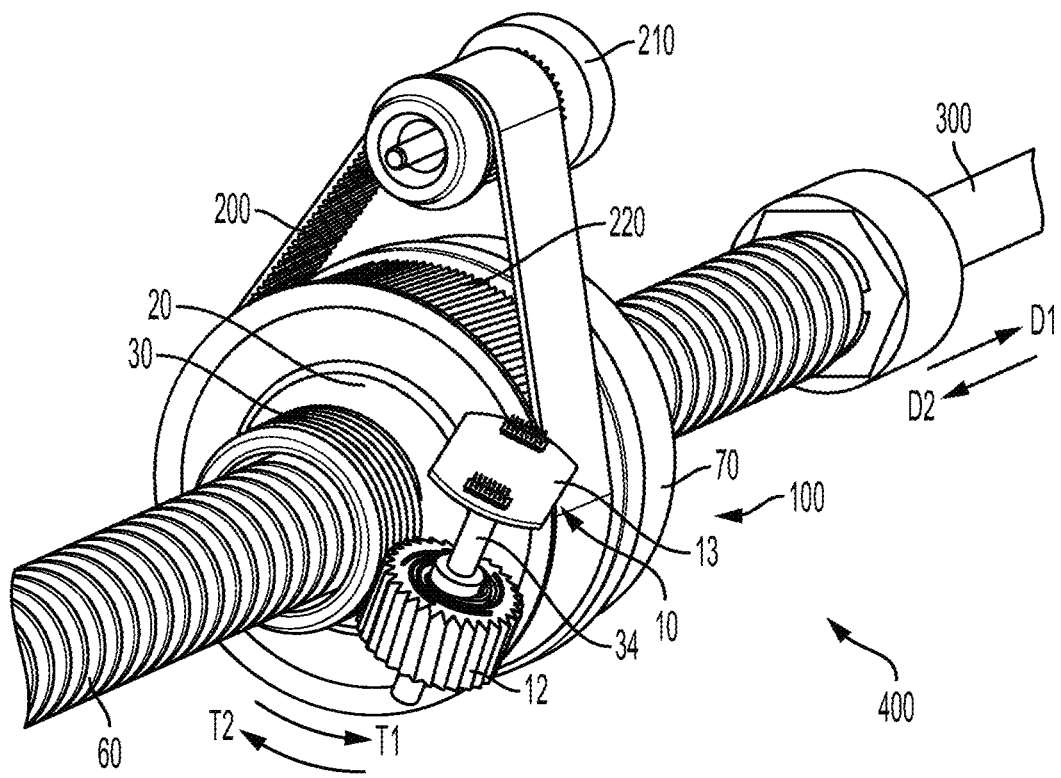
FIG. 1 is a perspective view of steering rack with a ball screw drive, tie rod, belt drive, and an embodiment of a sensor.

FIG. 1 shows a perspective view of a steering rack 400 with a ball screw drive (BSD) 100, belt drive 200, tie rod 300 (operatively connected to wheels of a vehicle) and an embodiment of a sensor 10. Torque is applied to a ball screw drive nut 20 (nut 20) of the BSD 100 via an electric motor 210 that is rotationally coupled to a pulley 70 via the belt drive 200 and a power transmission interface 220, such as ridged belt pulley as illustrated. The power transmission interface 220 can be any interface that is designed to rotationally couple the electric motor 210 to the pulley 70; for example, a sprocket interface and a corresponding chain can be utilized instead of the belt and ridged pulley interface 220 shown. First and second oppositely directed torques T1, T2 can be applied to the pulley 70 by the electric motor 210 to move the rack or threaded spindle 60 in either first or second linear directions D1, D2 to adjust a steering of a vehicle.

Figure 2:
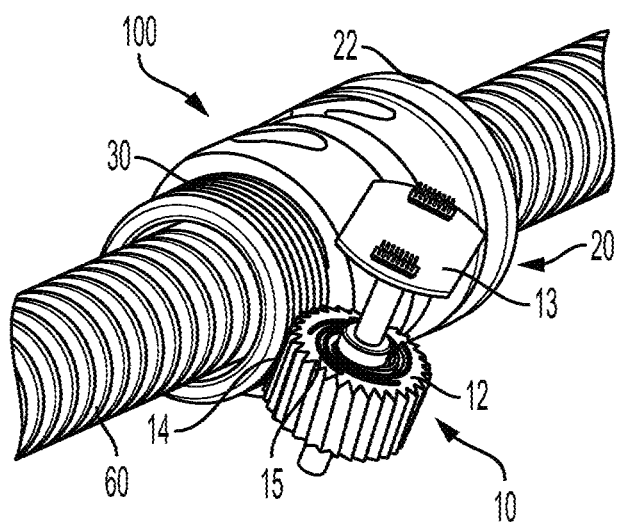
FIG. 2 is a perspective view of the steering rack, a nut of the ball screw drive, and the sensor of FIG. 1.
Figure 3:
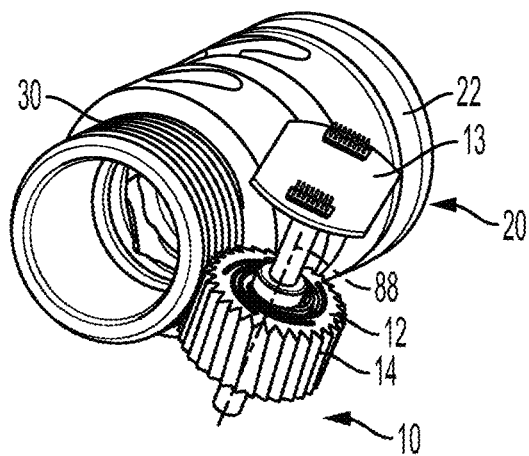
FIG. 3 is a perspective view of the nut and sensor of FIG. 2.

FIG. 2 shows a perspective view of the nut 20 installed on the threaded spindle 60 together with the sensor 10. FIG. 3 shows the nut 20 and sensor 10 without the threaded spindle 60. The nut 20 is integrally formed with an inner bearing raceway 22 for a main support bearing 21 and outer or external threads 30. The inner bearing raceway 22 and the outer or external threads 30 could also be implemented with separate components that are attached to the nut 20 via various attachment methods, including but not limited to welding, press-fitting, or fastening.

As shown in FIGS. 1-3, the external threads 30 engage teeth 14 of a sensor gear wheel 12 of the sensor 10 such that rotation of the nut 20 by the electric motor 210 rotates the sensor gear wheel 12 about a sensor gear axis 88. Rotation of the sensor gear wheel 12 changes a magnetic field position of the magnet 16 (shown in FIG. 4), that is detected by sensor electronics 13 having sensor elements arranged in a fixed position opposite to the magnet 16 in order to determine an angular position of a gear shaft 34 of the sensor gear wheel 12. The angular position of the gear shaft 34 can then be used to determine the linear position of the threaded spindle 60; therefore, an absolute position of the steering rack 400 can be obtained via the sensor 10 that fulfills the role of a rotational angle position sensor (or rotary position sensor). In an example embodiment, the nut 20 is configured as a worm gear via the external threads 30 and the sensor gear wheel 12 is configured as a worm wheel. In a further example embodiment, the sensor gear wheel 12 is constructed from plastic which can have a low coefficient of friction. Additionally, the sensor gear wheel 12 can be resiliently biased against the external threads 30 via an elastic mounting on the gear shaft 34, for example by a helical arrangement of slots 15 in the body of the sensor gear wheel 12 or via an elastic bushing between the sensor gear wheel 12 and the gear shaft 34.

Figure 4:
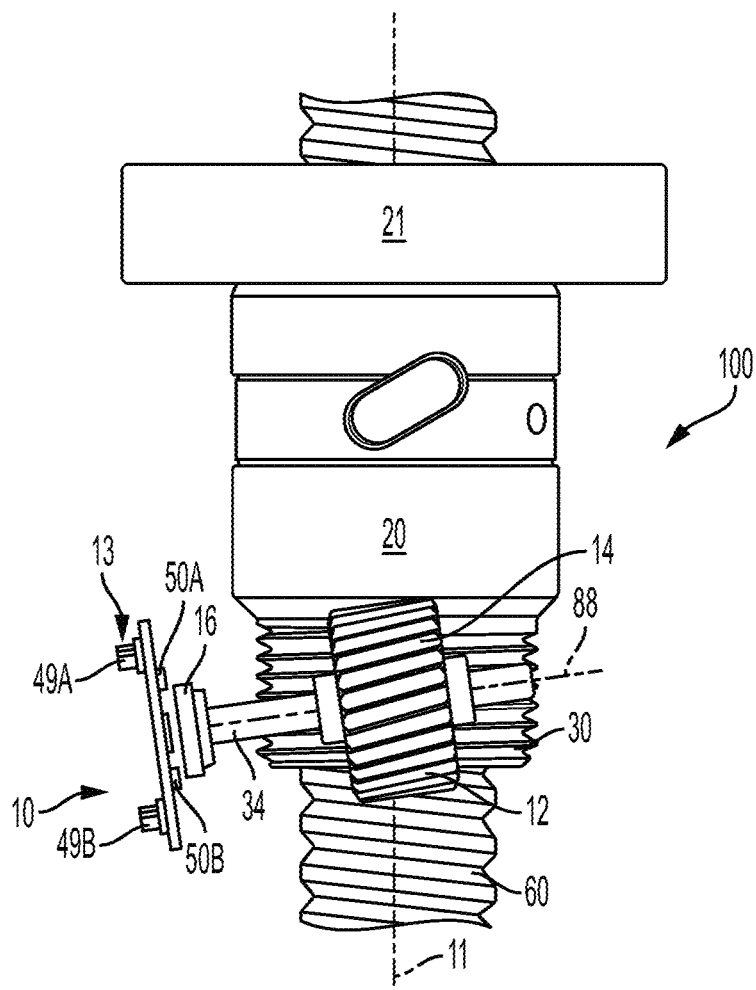
FIG. 4 is a side view of the components of FIG. 3 together with a bearing configured to support the nut.
Figure 5:
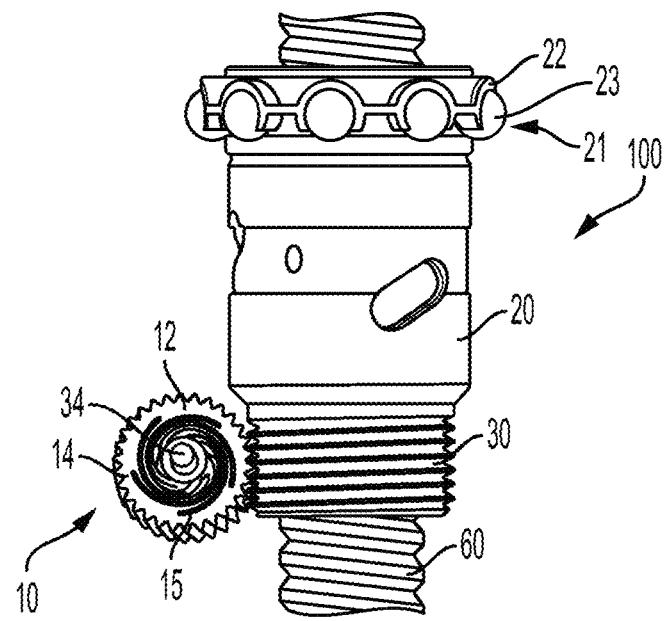
FIG. 5 is another side view of the components of FIG. 4, but without an outer ring of the bearing.
Figure 14:
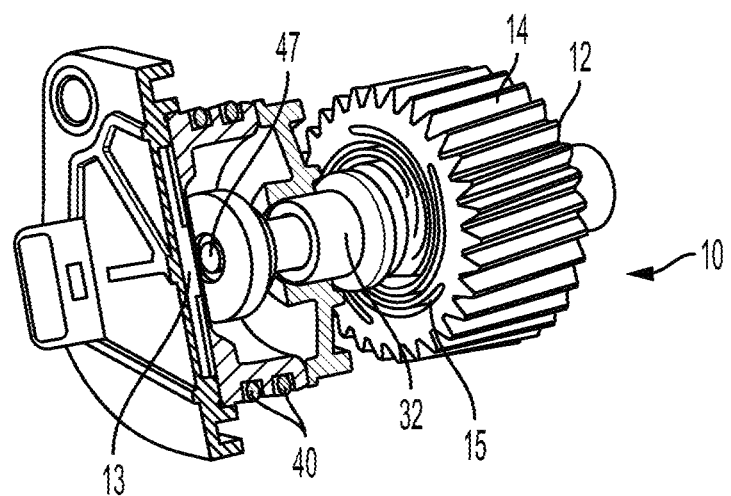
FIG. 14 is a partial cross-sectional view of an embodiment of a sensor showing a target, sensor electronics and a bearing.

FIGS. 4 and 5 show different perspectives of the components of FIG. 2. Here the main support bearing 21 is shown which includes the inner bearing raceway 22, rolling elements or balls 23 and an outer ring 25. FIGS. 14 and 16 show various constituents of the sensor 10. The sensor 10 includes a rotating permanent magnet 16 fixed to an end of the gear shaft 34, and sensor electronics 13 which may be fixed, for example, to a road wheel actuator (RWA) housing 80 (see FIG. 15). In an embodiment, the magnet 16 has two poles and is arranged coaxially with the sensor gear axis 88. The sensor gear axis 88 can be arranged at right angles to the spindle axis 11, or can be at an oblique angle. The sensor electronics 13, which can be described as a capturing device, includes Hall-effect sensor chips 50A, 50B, which derive the rotational angle of the gear shaft 34 via the permanent magnet 16, and first and second connectors 49A, 49B. Therefore, the sensor 10 can be classified as a Hall-effect sensor, which is a known sensor with known operating principles which do not need to be described further.

Figure 6:
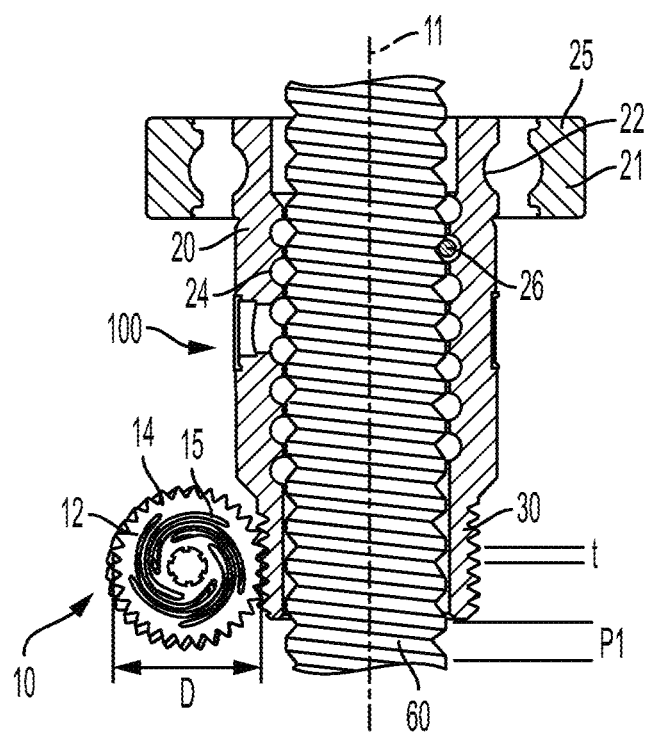
FIG. 6 is a cross-sectional view that shows some identifying dimensional traits of the ball screw drive and sensor.

FIG. 6 shows a cross-sectional view of the BSD 100 which shows internal threads 24 of the nut 20, balls 26, and an example embodiment of some dimensional thread traits of the BSD 100. The balls 26 or rolling elements are a known component within state-of-the-art $BSD_S$ and are radially arranged between the threaded spindle 60 and the internal threads 24 to facilitate conversion of rotary motion of the nut 20 to linear motion of the spindle 60. The thread pitch t of the external threads 30 can be less than the spindle pitch P1, which is equal to the BSD pitch. The diameter D of the sensor gear wheel 12 is given by $d=Z*t/\pi$, with t=thread pitch, Z=number of teeth 14 of sensor gear wheel 12. In an example embodiment, the pitch of the thread 30 is less than one-half of P1.

In an example embodiment, the sensor 10 will determine any angular position of the gear shaft 34 that resides within one revolution of the gear shaft 34 or sensor gear wheel 12. In a further example embodiment, one revolution of the gear shaft 34 is equal to 20 to 35 revolutions of the nut 20.

Figure 7:
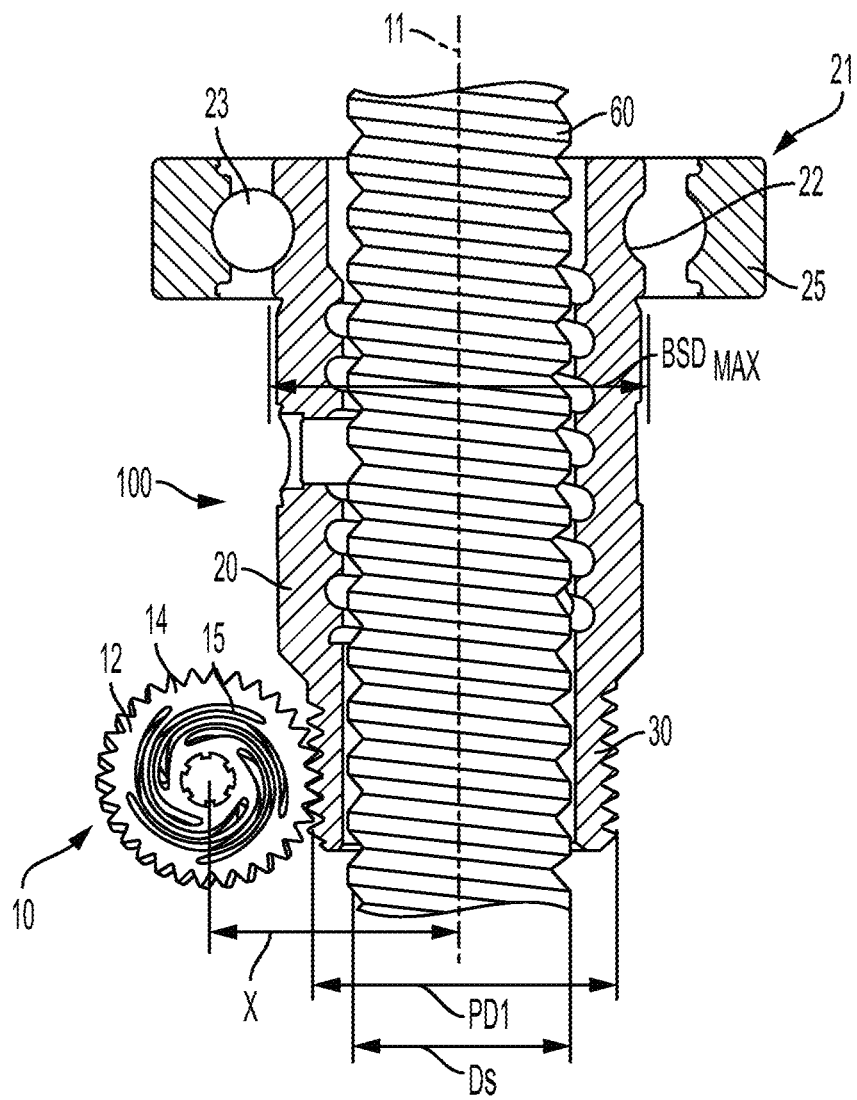
FIG. 7 is a cross-sectional view that shows some further identifying dimensional traits of the ball screw drive and sensor.

FIG. 7 shows an example embodiment of some additional dimensional external thread 30 traits. The thread pitch diameter PD1 is less than a maximum BSD diameter $BSD_{MAX}$. The diameter $D_S$ of the spindle 60 is indicated a well as the sensor axis distance X. Here $X>D_S$, and X may be 1.1 to 1.4 times greater than $D_S$. This arrangement allows close spacing of the sensor wheel 12 to the BSD 100, to provide a reduced overall envelope space.

In an example embodiment, a multi-turn sensor 10 can be utilized that will determine any angular position of the gear shaft 34 that resides within multiple revolutions (i.e. greater than one revolution) of the gear shaft 34 or sensor wheel 12. This embodiment could facilitate greater accuracy due to a smaller ratio between the number of revolutions of the nut 20 that correspond with the number of revolutions of the sensor wheel 12. For example, instead of 20 to 35 revolutions of the nut 20 corresponding to one revolution of the gear shaft 34, 20 to 35 revolutions of the nut 20 corresponds to three, four, or a higher amount revolutions of the gear shaft 34 or sensor wheel 12; therefore, in this example embodiment, one revolution of the nut 20 corresponds to a larger angular or rotational displacement of the gear shaft 34 or sensor wheel 12. This arrangement could be accomplished via adjustment of the previously described thread pitch t of the external threads 30, the number Z of sensor wheel teeth 14, or any other suitable characteristic that affects the nut revolution to corresponding gear shaft revolution relationship.

Figure 8:
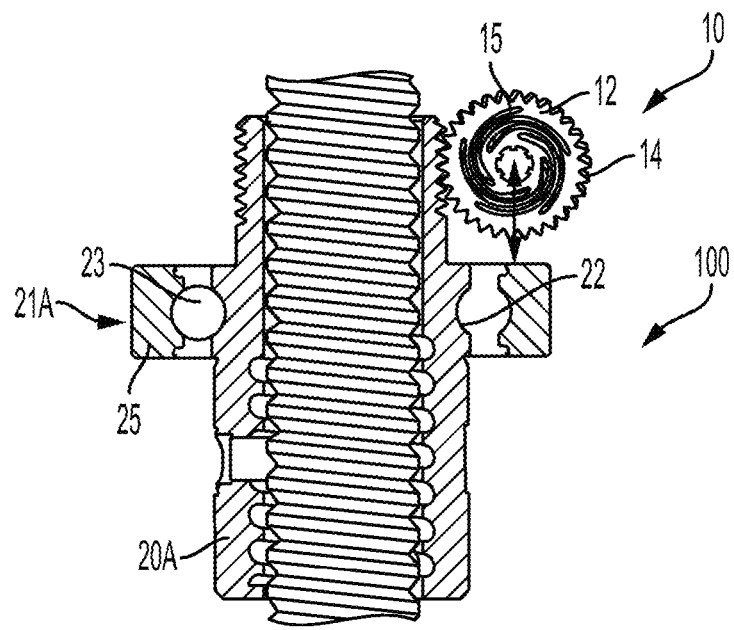
FIG. 8 is a cross-sectional view of the ball screw drive and sensor.

The location of the external threads 30 of the nut 20 can be varied to accommodate various packaging envelopes. FIGS. 1 through 7 show a configuration of the nut 20 where the external threads 30 and bearing 21 are at opposite ends of the nut 20. FIG. 8 shows a configuration where the bearing 21A (similar to the bearing 21) is arranged at a medial location (between the ends) of the nut 20A (similar to nut 20), with the external threads 30A arranged at an end. This arrangement with the threads 30A adjacent and in close proximity to the bearing 21A helps to minimize displacement of portion of the nut 20A that carries the external threads 30A under load and allows the sensor wheel to be located at a distance Y from the main support bearing 21A that is less than the distance X which minimizes possible BSD 100 deflections from affecting the engagement of the sensor wheel 12 with the external threads 30, ensuring accurate measurement of the displacement of the threaded spindle 60. Other suitable external thread and bearing arrangements for the nut 20 not shown in the Figures are also possible.

Figure 9:
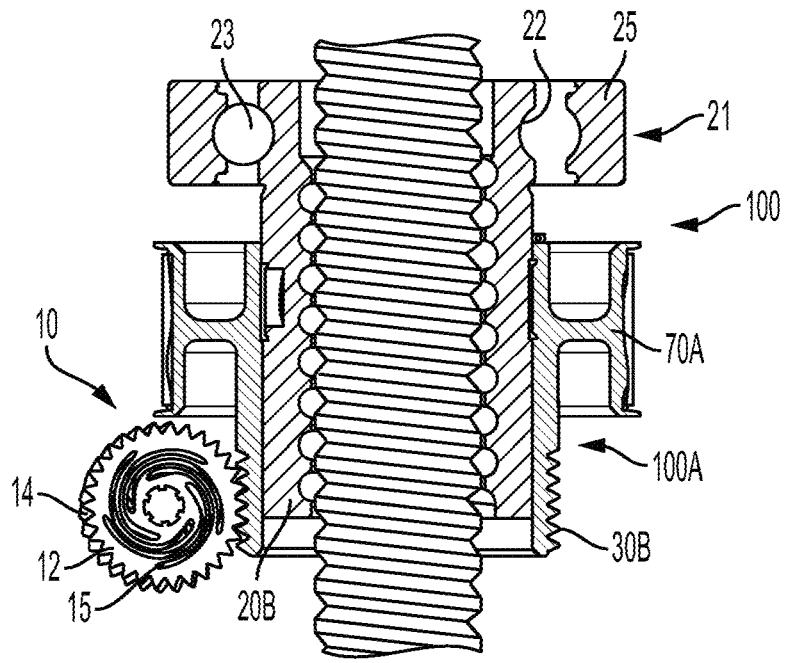
FIG. 9 is a cross-sectional view that shows a pulley secured to the nut, and the pulley includes external threads configured to mesh with a gear of the sensor.

FIG. 9 shows an example embodiment of the BSD 100A, functionally equivalent to the BSD 100. The differences are noted below. Here, a pulley 70A that drives the BSD 100A and includes the external threads 30B (similar to the external threads 30) that form part of the sensor 10 is formed as a separate component and can be assembled with the nut 20B (similar to the nut 20 described above) via various attachment methods, including but not limited to adhesive bonding, welding, press-fitting, or fastening. The external threads 30B can either be a separate component attached to the pulley 70A or integrated with the pulley 70A as shown in FIG. 9.

Figure 10:
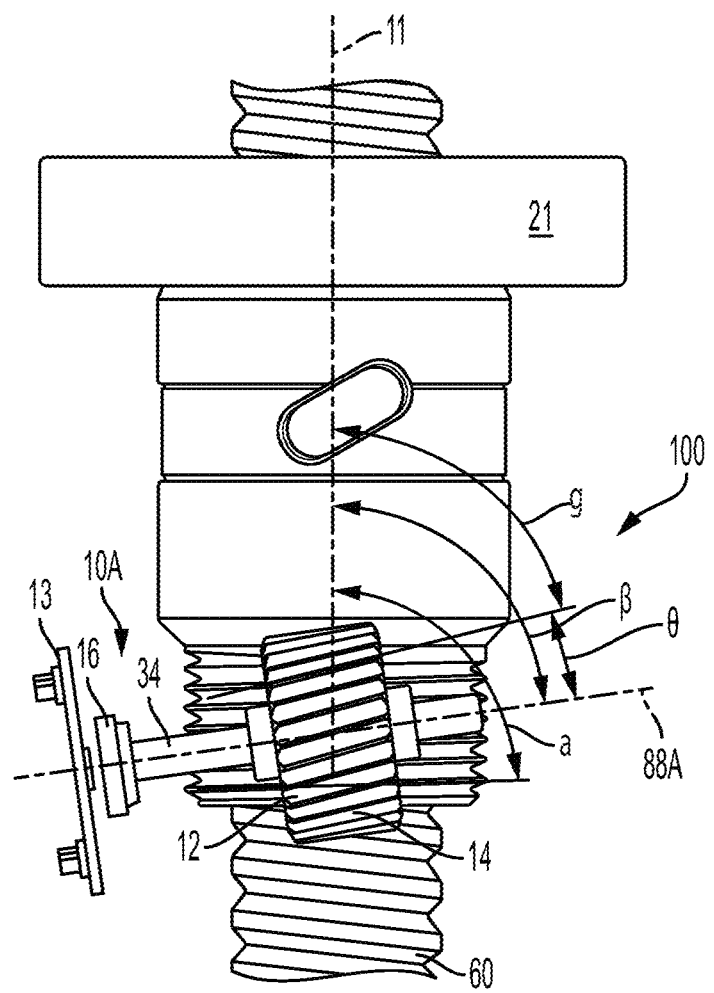
FIG. 10 is a top view of an embodiment of that shows the sensor inclined relative to an axis of the nut and threaded spindle.

FIG. 10 shows an embodiment of the sensor 10A similar to the sensor 10 described above. Here, a sensor gear axis 88A (which can also be referred to as a rotational axis) is arranged obliquely or non-perpendicularly to the BSD 100 (or main bearing 21) axis 11. FIG. 10 also shows: i) how the external threads 30 can be inclined at an angle α relative to the BSD axis 11, ii) how the sensor gear axis 88A of the sensor gear wheel 12 can be inclined at an angle β to the BSD axis 11, iii) how the gear helix of the sensor gear wheel 12 can be inclined at an angle θ to the sensor gear axis 88A, and how the gear helix of the sensor gear wheel 12 can be inclined at an angle γ relative to the BSD axis 11. α can be for example in a range of 70° to 89°, and β can be for example in a range of 80° to 89°. θ can be for example in a range of 0° to 10°. γ can be for example in a range of 80° to 89°. However, these ranges are non-limiting and could be adjusted based on the particular application.

Figure 11:
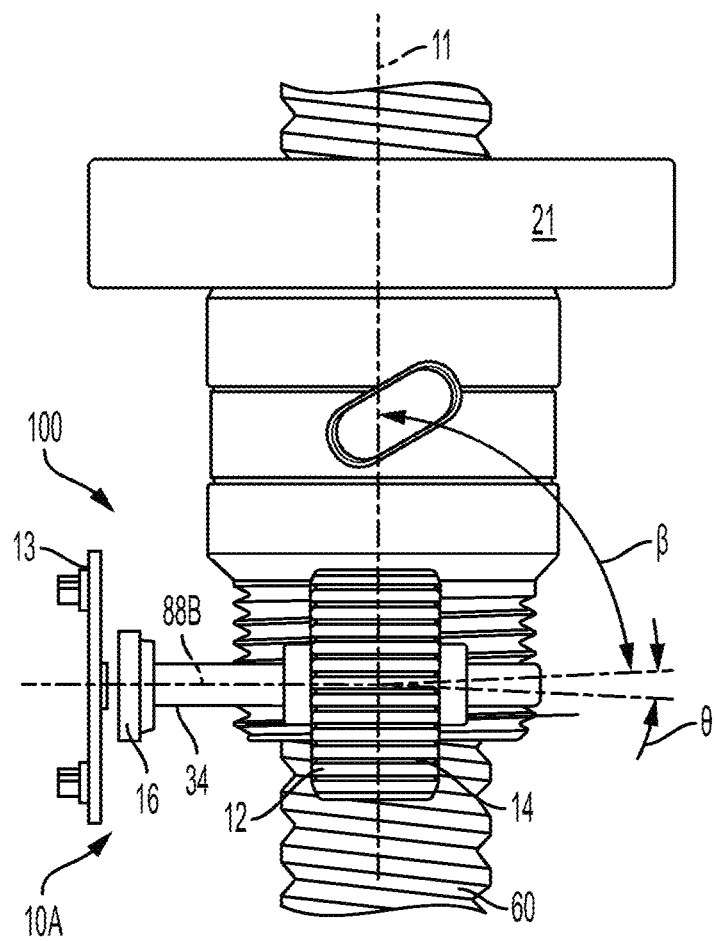
FIG. 11 is a top view of an embodiment that shows an embodiment of a sensor inclination range relative to an axis of the nut and threaded spindle.

FIG. 11 shows an embodiment where the sensor gear axis 88B is inclined at an angle β between 70° to 110°, relative to the BSD axis 100. FIG. 11 also shows: a negative gear helix angle θ, which can be for example in a range of 0° to −10°. This arrangement has several advantages in that the sensor can easily be assembled to the RWA, by shifting it along its axis the sensor gear has a low helix angle allowing its manufacture, for example, by injection molding of plastic, the housing of the RWA can easily accommodate the sensor by some cast and/or drilled hole and screws, and the sensor electronics 13 and connector (not shown) can be placed and oriented without collision to BNA 100 or powerpack 210 or rack 400.

Figure 11A:
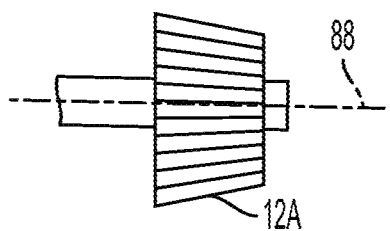
FIG. 11A is a top view of an alternate embodiment of a sensor gear wheel having a conical profile

FIG. 11A shows an example embodiment of a sensor gear wheel 12A having a conical profile. The sensor gear wheel 12A could be used in the above described arrangements of the BSD 100, and would also allow for easier manufacture and assembly.

Figure 12:
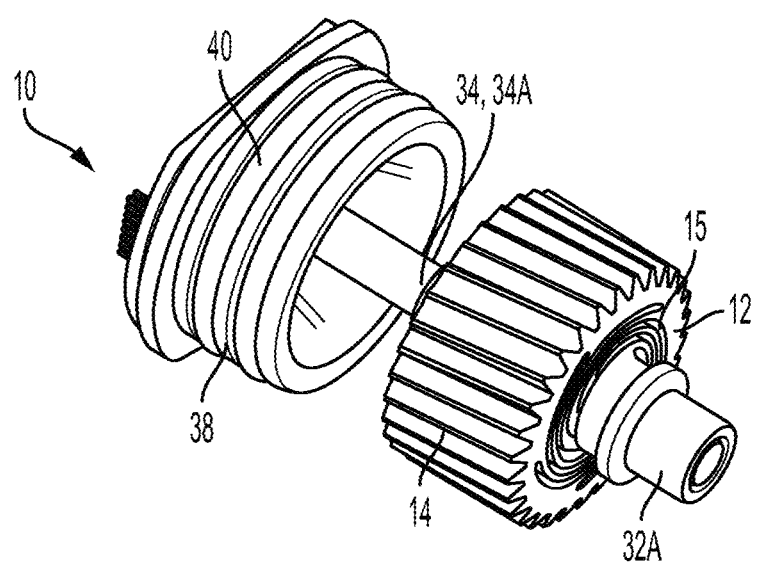
FIG. 12 is a perspective view of an embodiment of a sensor that incorporates elastic properties.

FIG. 12 shows example embodiments of how the BSD 100 and sensor 10 can be designed to counteract displacements of the BSD 100 during operation caused by rack bending. These arrangements keep the gear teeth 14 in contact with the external 30 without displacement or lash. One such solution involves incorporation of an elastic characteristic within the sensor 10. Such an elastic characteristic can be implemented via the helical or other arrangement of slots 15 or other weakening in the body of the sensor gear wheel 12 radially inwardly of the gear teeth 14. Alternatively, or in addition, an elastic bushing 32A can be provided between the sensor gear wheel 12 and the gear shaft 34. Other elastic implementations include an elastic member arranged to connect the shaft 34 to a rim of the gear 12. Alternatively, the shaft 34A can be an elastically deflectable shaft, with the shaft itself being elastic, having a small diameter, and or having a long distance between bearings. One or more of these may be implemented in order to pre-load or bias the sensor gear wheel 12 toward the spindle 60, which is effective in maintaining sensor function even with 1 mm+radial displacements of the BSD 100. Other elastic implementations within the sensor gear and corresponding shaft are also possible, such as mounting the shaft 34 in the steering assembly housing using an elastic mounting, such as elastically mounted bearings to provide the elastic pre-load.

FIG. 12 also shows a carrier 38 with O-rings 40 that can support the sensor electronics for the sensor 10.

Figure 13:
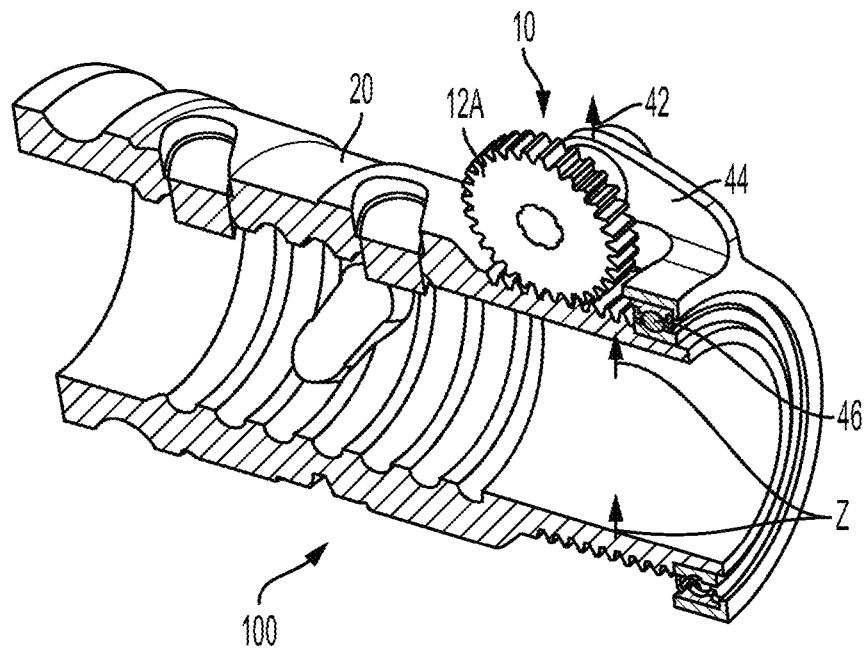
FIG. 13 is a cross-sectional view of an embodiment of a sensor in a follower configuration.

FIG. 13 shows a partial view of the BSD 100 with an example embodiment of another way to counteract displacement, indicated as arrows Z, of the BSD 100 during operation. In this embodiment, the sensor gear wheel 12A is incorporated within a follower configuration such that a displacement of the BSD100 would also yield a "following" displacement of a sensor bearing 42 that supports the sensor gear wheel 12A. This is accomplished via a link or bracket 44 that extends from the sensor shaft bearing 42 to another bearing 46 extending around the circumference of and supported on an end of the nut 20. Other follower configurations or arrangements are also possible.

FIG. 14 shows partial cross-sectional view of an embodiment of a sensor 10 shown as a pre-assembled sub-assembly that includes a target 47, sensor electronics 13, O-rings 40 and a bearing 32. This sub-assembly is easily incorporated as a unit into the steering rack 400.

Figure 15:
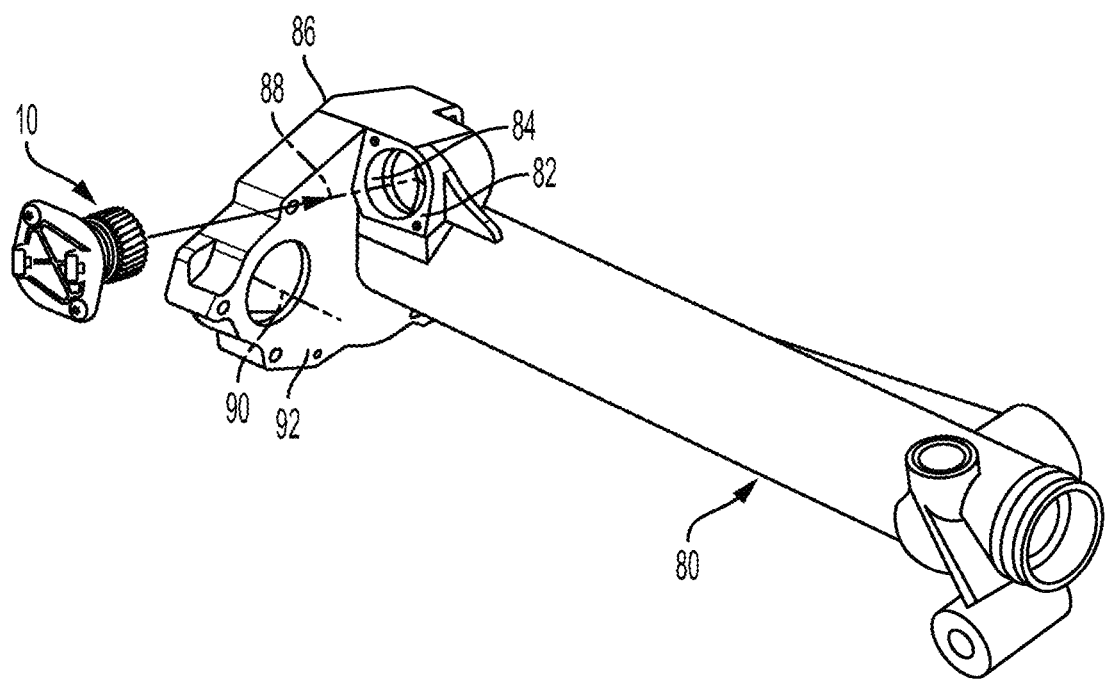
FIG. 15 is a perspective view of an embodiment of a housing that incorporates the ball screw drive and an embodiment of a sensor.
Figure 16:
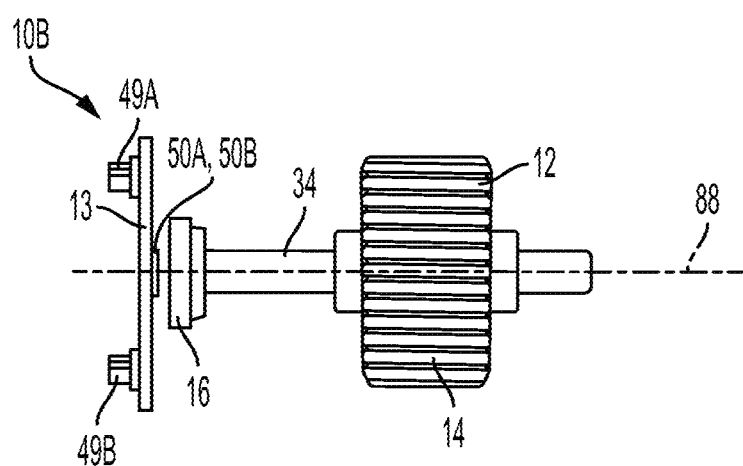
FIG. 16 is a side view of an embodiment of a sensor that shows two connectors and respective Hall sensor chips.

FIG. 15 shows an installation location within a housing 80, which can be a road wheel actuator housing 80 for a steering rack 400, which houses the threaded spindle 60 and other components of the BSD 100. As shown, the housing 80 includes mounting provisions for the sensor 10 sub-assembly shown in FIG. 14, including: i) a cylindrical inner surface 84 that provides a sealing surface for the O-rings 40 for the sensor embodiment shown in FIG. 14, ii) a flat surface 82 and corresponding holes to mount the sensor 10 to the housing 80, iii) a flat surface 86 to assemble another housing portion to the housing 80, and iv) a flat surface 92 to mount a powerpack to the housing. The powerpack can include the electric motor 210 and an electronic control unit. A powerpack axis 90 and the sensor gear axis 88 are also shown within FIG. 15. In an example embodiment, the powerpack axis 90 is offset from the sensor gear axis 88. In a further example embodiment, the powerpack axis 90 is generally perpendicular to the sensor gear axis 88.

FIG. 16 is a side view of an embodiment of the sensor 10B, similar to the sensor 10 described above. In this embodiment, the stationary electronics 13 of the sensor 10 includes Hall-effect sensor chips 50A, 50B along with corresponding connectors 49A, 49B. The Hall-effect sensor chips 50A, 50B can detect changes in the magnetic field from the magnet 16 that is rotated by the shaft 34. Alternatively, the target detected by the sensor electronics 13 can be a flat ring with a wing-like conductive contour, reflecting high-frequency electromagnetic radiation and the stationary electronics 13 includes antenna loops on a PCB to broadcast and receive high-frequency signals to identify its reflection based on the amount of geometric overlap between the target-wing and the antennas forming an inductive sensor. In either case, the stationary electronics 13 can be housed within an embodiment of a carrier (an example embodiment thereof shown in FIG. 12) which can be mounted to the previously described housing 80. The sensor 10B can be used within a sensor system that incorporates redundancy in case of failure of one or more sensor components. Additional sensor types, such as linear sensors, rotary or rotational sensors, and powerpack rotation sensors can be utilized.

The previously shown and described sensor embodiments can be utilized within mechanical power-assisted steering systems or steer-by-wire systems, which can be present within manual or autonomous vehicles. The previously described sensor embodiments can also be utilized within front, rear, or all-wheel steering systems.

The previously shown and described sensor embodiments can generate an electric signal to control (or feedback control) or supervise steering function or to adjust an additional steering position sensor.

The previously shown and described BSD 100 can be driven via a belt drive (as shown), a chain drive, a gear drive, or a direct drive (hollow shaft motor arranged coaxial to BSD 100).

The BSD 100 can be used in power-assisted mechanical steering and steer-by-wire systems for front. Rear and/or all wheel steering.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

ELEMENT NUMBERS

10, 10A, 10B sensor
11 spindle axis
12, 12A sensor gear wheel
13 sensor electronics
14 teeth
15 arrangement of slots
16 magnet
20, 20A, 20B ball screw drive nut (nut)
21, 21A main support bearing
22 inner bearing raceway
23 balls/rolling elements
24 internal thread
25 outer ring
26 balls
30, 30A, 30B external threads
34, 34A gear shaft 38 carrier
40 o-rings
42 sensor bearing
44 link or bracket
46 bearing
47 target
49A, 49B connectors
50A, 50B sensor chips
60 threaded spindle
70, 70A pulley
80 road wheel actuator (RWA) housing
82 flat surface
86 flat surface
88, 88A sensor gear rotation axis
90 power pack axis
92 flat surface
100, 100A ball screw drive (BSD)
200 belt drive
210 electric motor/power pack
220 power transmission interface
400 steering rack
$BSD_{MAX}$ maximum BSD diameter
D diameter of sensor gear wheel
$D_S$ spindle diameter
D1, D2 directions
P1 spindle pitch
t thread pitch of the external threads 30
T1, T2 torques
X sensor axis distance
Y distance
Z number of teeth 14
α angle
β angle
θ angle
γ angle

What is claimed is:

1. A ball screw drive for a vehicle steering system, the ball screw drive comprising:
a nut configured to receive torque from a power transmission drive, the nut having internal threads, and external threads being provided on the nut;
a threaded spindle having a spindle thread, the threaded spindle being drivable by the internal threads of the nut such that rotary motion of the nut is translated into linear motion of the threaded spindle; and
a rotational angle sensor having a sensor gear rotatably driven by the external threads of the nut, the rotational angle sensor is configured to generate an electric signal based on a rotational position of the sensor gear;
wherein the nut is monolithically formed with the internal threads and the external threads.

2. The ball screw drive of claim 1, wherein the nut is configured as a worm gear via the external threads and the sensor gear is configured as a worm wheel.

3. The ball screw drive of claim 1, wherein a rotational axis of the sensor gear is perpendicular to a rotational axis of the nut.

4. The ball screw drive of claim 1, wherein a rotational axis of the sensor gear is arranged obliquely relative to a rotational axis of the nut.

5. The ball screw drive of claim 1, further comprising a shaft on which the sensor gear is mounted, and a magnet connected to the shaft.

6. The ball screw drive of claim 1, wherein the nut further comprises a bearing.

7. The ball screw drive of claim 6, wherein the bearing is arranged at a first end of the nut, and the external threads are arranged at a second end of the nut.

8. The ball screw drive of claim 6, wherein the bearing is arranged at a medial position on the nut, and the external threads are arranged at an end of the nut.

9. The ball screw drive of claim 6, wherein the nut is integrally formed with an inner bearing raceway of the bearing.

10. The ball screw drive of claim 1, wherein a pitch of the external threads is less than one-third of a pitch of the spindle thread.

11. The ball screw drive of claim 1, wherein teeth of the gear are biased to engage with the external threads.

12. The ball screw drive of claim 1, wherein the sensor gear is arranged in a follower configuration relative to the nut.

13. The ball screw drive of claim 12, wherein the follower configuration includes a link attached to a shaft of the sensor gear and arranged for movement with the nut such that radial displacement of the nut is translated to the gear via the link.

14. The ball screw drive of claim 1, further comprising rolling elements located between the internal thread and the spindle thread via which the rotary motion of the nut is translated to the linear motion of the threaded spindle.

15. A ball screw drive for a vehicle steering system, the ball screw drive comprising:
a nut having internal threads;
a drive element including a pulley having external threads and a power transmission interface, the drive element secured to the nut and configured to receive torque via the power transmission interface;
a threaded spindle configured to cooperate with:
i) internal threads of the nut, and
ii) rolling elements arranged radially between the internal threads of the nut and spindle threads of the threaded spindle, such that rotary motion of the nut is translated to linear motion of the threaded spindle;
a gear rotatably driven by the external threads; and
a rotational angle sensor configured to generate an electric signal based on rotation of the gear.

16. The ball screw drive of claim 15, further comprising: a housing configured to house the spindle and the nut; and sensor electronics attached to the housing, the sensor electronics configured to cooperate with a magnet that rotates with the gear to generate the electric signal.

17. The ball screw drive of claim 15, wherein the power transmission interface includes a ridged power transmission interface.

18. A ball screw drive for a vehicle steering system, the ball screw drive comprising:
a nut configured to receive torque from a power transmission drive, the nut monolithically formed with internal threads and external threads;
a threaded spindle having a spindle thread, the threaded spindle being drivable by the internal threads of the nut such that rotary motion of the nut is translated into linear motion of the threaded spindle; and
a rotational angle sensor having a sensor gear rotatably driven by the nut, the sensor gear being elastically biased against the external threads of the nut, and the rotational angle sensor is configured to generate an electric signal based on a rotational position of the gear.

19. The ball screw drive of claim 18, wherein the teeth of the gear are biased via circumferential elasticity of the gear.

20. The ball screw drive of claim 18, wherein the teeth of the gear are biased via an elastic shaft of the gear.

* * * * *